L. GILSON.
HAND TRUCK.
No. 105,564.   Patented July 19, 1870.
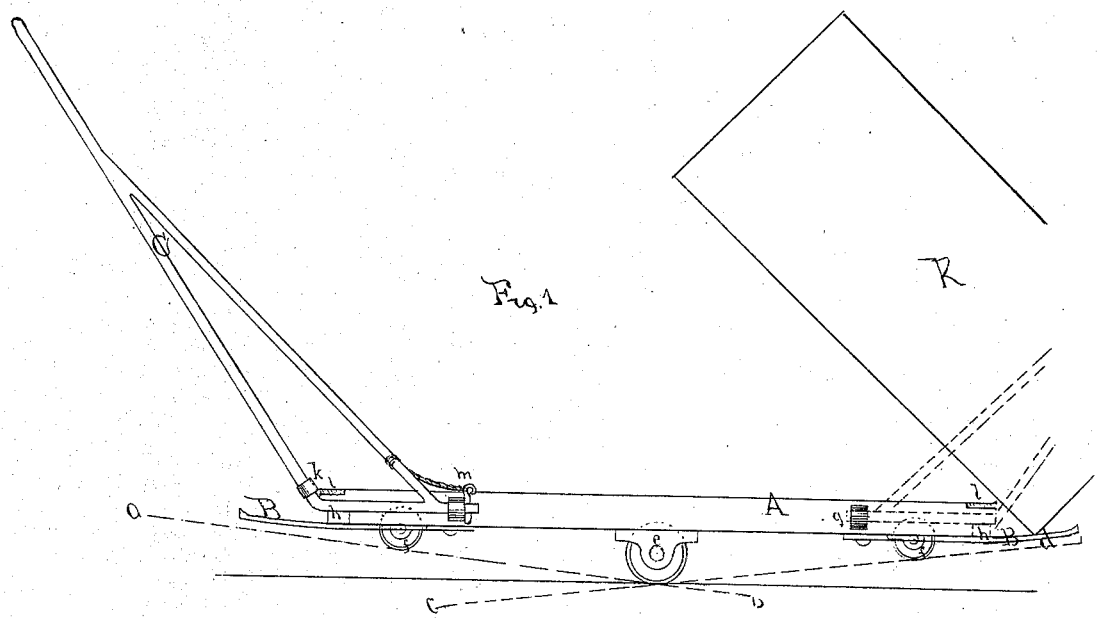
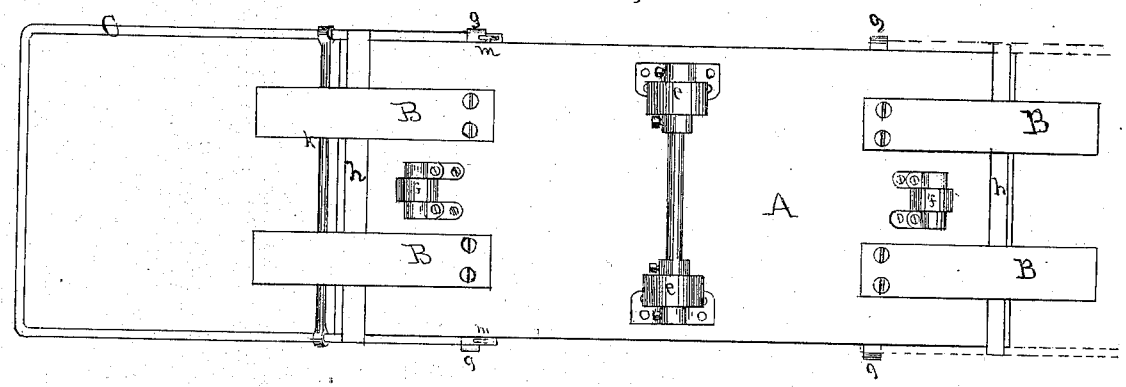
Witness
Inventor
Leonard Gilson

United States Patent Office.

LEONARD GILSON, OF BOSTON, MASSACHUSETTS, ASSIGNOR TO HIMSELF AND E. STONE GOODWIN, OF SAME PLACE.

Letters Patent No. 105,564, dated July 19, 1870.

IMPROVEMENT IN HAND-TRUCKS.

The Schedule referred to in these Letters Patent and making part of the same.

*To all whom it may concern:*

Be it known that I, LEONARD GILSON, of Boston, in the county of Suffolk and State of Massachusetts, have invented certain new and useful Improvements in Inclined Reversible Platform-Trucks, of which the following is a full, clear, and exact description, reference being had to the accompanying drawing making part of this specification, in which—

Figure 1 represents a side elevation, and

Figure 2, a bottom side view.

This invention relates to hand-trucks which are used in warehouses or stores, or in and about railroad stations or other places, for removing heavy boxes or cases of goods or merchandise; and It has for its object to furnish a simple, cheap, and durable truck, and, at the same time, one that can be easily loaded and as easily handled or maneuvered to transport the load to an elevator or a door-way, or to a car, and through any circuitous route, by a single person.

The platform A has a central axle, which is furnished with wheels, *e*, preferably arranged beneath the former, so that the sides shall be wholly unobstructed, and allow long cases to overhang the truck.

On these central wheels the truck is moved or swung or turned, when at rest or while in motion, or guided at the will of the operator.

At or near each end of the platform, and secured to its under side, at or near the center of the width, is a wheel, *f*, somewhat smaller in diameter than are the center wheels, which allows either end to be brought near the floor for loading, and also allows the truck to be moved easily with the load upon or nearest one end of it.

Bottom bars or spring plates, B, are secured to the under side of the platform, on opposite sides of each wheel *f*, and these bars project beyond the ends of the truck A, as shown.

A sharp-edged plate, *l*, is fastened to each end, and on the top side of the platform.

Removable and changeable shafts or lever-handles, C, are applied to either end of the platform by eyes or sockets *g*, and secured by pins *m*, the heels of the shafts resting on the projecting ends of a plate, *h*, secured to the under side of the truck.

When a heavy case, K, is to be loaded, the truck is run back to near the case, say, standing on one end, the case is inclined a little, and the plates B run under it.

The case is then moved over, as shown in fig. 1, where its under side comes onto the sharp edge of the plate *l*, with its end still resting on the bars B, and the truck anchored to the floor by the weight of the case, which, when lowered onto the truck, is prevented from sliding rearward, and liberates the spring plates from the floor, and the loaded truck is easily moved to any place desired, either on the two center wheels and on the one end wheel, or on the center ones alone, by bearing down on the lower handles, and raising the smaller wheel from the floor.

Two sets of lever-handles may be applied to the eyes *g*, one set at each end of the truck, and either set of handles removed for loading.

When this truck has been loaded at one end, another heavy case may be loaded onto the opposite end, first removing the detachable handles.

This peculiar feature of my improved truck renders it readily available for a wider range of useful purposes than any other truck of which I have any knowledge, and which can only be loaded (with heavy cases) by holding the truck or by blocking the wheels, which, when blocked, are liable to slip their blocking and run forward, and drop the partly loaded case onto the floor.

The bottom bars or spring plates prevent any forward movement of the truck when loading, and the sharp-edged holding-plates prevent the case sliding rearward, as before explained.

What I claim, and desire to secure by Letters Patent, is—

1. The removable and changeable shafts or lever-handles, in combination with the eyes *g* and with the plate *h* and platform A, for the purpose and substantially as described.

2. The bottom bars or spring plates B, applied to the platform A in the manner and for the purpose substantially as described.

3. The combination, substantially as described, with the wheel-furnished platform of stationary bottom bars B and a sharp-edged plate, *l*, operating in connection to anchor the truck and to hold a case while loading, as specified.

4. A reversible hand-truck, as described, consisting of wheel-furnished platform A, movable shafts or lever-handles, bearing-bars *h*, holding-plate *l*, and bottom bars or spring plates B, all arranged substantially in the manner and to effect the objects herein set forth.

LEONARD GILSON.

Witnesses:
M. M. TIDD,
JOHN E. CRANE.